(12) United States Patent
Kirtley et al.

(10) Patent No.: US 6,851,264 B2
(45) Date of Patent: Feb. 8, 2005

(54) SELF-ASPIRATING HIGH-AREA-RATIO INTER-TURBINE DUCT ASSEMBLY FOR USE IN A GAS TURBINE ENGINE

(75) Inventors: Kevin Kirtley, Scotia, NY (US); Paolo Graziosi, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 131 days.

(21) Appl. No.: 10/279,514

(22) Filed: Oct. 24, 2002

(65) Prior Publication Data

US 2004/0079084 A1 Apr. 29, 2004

(51) Int. Cl.[7] ............................. F02C 1/00; F02C 3/04
(52) U.S. Cl. .......................... 60/772; 60/39.5; 60/805; 415/144; 415/914
(58) Field of Search .................... 60/805, 806, 39.5, 60/772, 787; 415/115, 116, 144, 145, 914, 917

(56) References Cited

U.S. PATENT DOCUMENTS

| | | | | |
|---|---|---|---|---|
| 3,088,281 A | * | 5/1963 | Ernest et al. | 60/752 |
| 3,641,766 A | * | 2/1972 | Uehling | 60/262 |
| 4,515,524 A | * | 5/1985 | Fisher, Jr. | 415/169.1 |
| 5,826,424 A | * | 10/1998 | Klees | 60/262 |

OTHER PUBLICATIONS

"Flow Control Opportunities in Gas Turbine Engines", by W.K. Lord et al, Conference Proceedings, American Institute of Aeronautics and Astronautics, Jun. 19–22, 2000/ Denver, CO, pp. 1–15.

* cited by examiner

Primary Examiner—Charles G. Freay
(74) Attorney, Agent, or Firm—Richard A. DeCristofaro; Richard K. Patnode (57) ABSTRACT

In various embodiments, the present invention provides a means for improving gas turbine engine performance by applying fluid flow control to the inter-turbine duct joining a high-pressure turbine spool and an associated low-pressure turbine spool, allowing the low-pressure turbine spool to have a relatively larger diameter than the high-pressure turbine spool. One or more unobstructed fluid flow paths between one or more boundary layer suction ports disposed within the upstream end of the outer-body surface of the inter-turbine duct and the suction side of the associated low-pressure turbine nozzle are provided. Advantageously, the natural static pressure difference between these points results in a self-aspirating assembly. The fluid flow control provided by the respective suction and blowing forces generated allows for a relatively larger diameter low-pressure turbine spool and/or relatively fewer low-pressure turbine nozzles to be used than is possible with conventional systems, assemblies, and methods. Thus, a gas turbine engine weight savings and optimized performance may be achieved.

49 Claims, 3 Drawing Sheets

SELF-ASPIRATING HIGH-AREA-RATIO INTER-TURBINE DUCT ASSEMBLY FOR USE IN A GAS TURBINE ENGINE

FIELD OF THE INVENTION

The present invention relates generally to the field of gas turbine engines. More specifically, the present invention relates to a self-aspirating high-area-ratio inter-turbine duct assembly for use in a gas turbine engine or the like operable for generating thrust and/or power.

BACKGROUND OF THE INVENTION

As is known to those of ordinary skill in the art, there is a preferred ratio between the diameter of the high-pressure turbine spool (including the high-pressure turbine nozzle and the associated high-pressure turbine rotor) and the diameter of the associated low-pressure turbine spool (including the low-pressure turbine nozzle and the associated low-pressure turbine rotor) in a gas turbine engine, with the low-pressure turbine spool having a relatively larger diameter than the high-pressure turbine spool. As described herein below, this ratio provides optimal gas turbine engine performance. However, in order to achieve this preferred ratio, the slope of the outer-body surface of the inter-turbine duct joining the high-pressure turbine spool and the low-pressure turbine spool must be relatively steep for a given inter-turbine duct length. Alternatively, the length of the outer-body surface of the inter-turbine duct may be relatively long. Given conventional systems, assemblies, and methods, either configuration is problematic.

If the slope of the outer-body surface of the inter-turbine duct is relatively steep, strong adverse pressure gradients may be created along the outer-body surface and boundary layer separation may occur in the inter-turbine duct. As a result, gas turbine engine performance may suffer. If the length of the outer-body surface of the inter-turbine duct is relatively long, extra weight is added to the gas turbine engine and, again, performance may suffer. Thus, conventional gas turbine engines typically use non-optimal inter-turbine ducts that are relatively long and that have outer-body surfaces with a relatively shallow slope. For example, an inter-turbine duct with a length of approximately twice the height of the high-pressure turbine rotor and a slope of about 31 degrees may be used.

Thus, what is needed are systems, assemblies, and methods that minimize the creation of adverse pressure gradients along the outer-body surface and prevent boundary layer separation in the inter-turbine duct, allowing for the manufacture and use of an outer-body surface that has a relatively steep slope. This would allow either a relatively short inter-turbine duct to be used, minimizing weight, or a relatively higher diameter low-pressure turbine that optimizes gas turbine engine performance. What is also needed are systems, assemblies, and methods that provide such an inter-turbine duct relatively inexpensively and using conventional manufacturing techniques and materials.

BRIEF SUMMARY OF THE INVENTION

In various embodiments, the present invention provides a means for improving gas turbine engine performance by applying fluid flow control to the inter-turbine duct joining the high-pressure turbine spool and the associated low-pressure turbine spool, allowing the low-pressure turbine spool to have a relatively larger diameter. One or more unobstructed fluid flow paths between one or more boundary layer suction ports disposed within the upstream end of the outer-body surface of the inter-turbine duct and one or more blowing ports on the suction side of the associated low-pressure turbine nozzle are provided. Advantageously, the natural static pressure difference between these points results in a self-aspirating assembly. The fluid flow control provided by the respective suction and blowing forces allows for a relatively larger diameter low-pressure turbine spool to be used than is possible with conventional systems, assemblies, and methods. The suction on the outer-body surface of the inter-turbine duct prevents the boundary layer from separating along the outer-body surface by removing the low-momentum fluid that precipitates the boundary layer separation. The blowing on the suction side of the low-pressure nozzle increases fluid mixing in the boundary layer and introduces higher-momentum flow along the outer-body surface, also preventing boundary layer separation. By preventing boundary layer separation on the suction side of the low-pressure nozzle, the low-pressure nozzle is able to withstand relatively higher aerodynamic loads. Thus, relatively fewer low-pressure turbine nozzles may be used, resulting in gas turbine engine weight savings or a relatively higher pressure drop and optimized performance.

In one embodiment of the present invention, an inter-turbine duct assembly for use in a gas turbine engine or the like includes a duct having an upstream end and a downstream end, wherein the duct comprises an inner-body surface and an outer-body surface, and wherein the duct forms a primary fluid flow path. The inter-turbine duct assembly also includes a port disposed within the outer-body surface of the duct and a nozzle coupled with the duct. The inter-turbine duct assembly further includes a channel having an upstream end and a downstream end, wherein the upstream end of the channel is coupled with the port and the downstream end of the channel is disposed within the nozzle, and wherein the channel forms a bypass fluid flow path between the duct and the nozzle.

In another embodiment of the present invention, an inter-turbine duct assembly for use in a gas turbine engine or the like includes an inter-turbine duct having an upstream end and a downstream end, wherein the inter-turbine duct comprises an inner-body surface and an outer-body surface, and wherein the inter-turbine duct forms a primary fluid flow path. The inter-turbine duct assembly also includes a boundary layer suction port disposed within the outer-body surface of the inter-turbine duct and a low-pressure turbine nozzle coupled with the inter-turbine duct. The inter-turbine duct assembly further includes a bypass channel having an upstream end and a downstream end, wherein the upstream end of the bypass channel is coupled with the boundary layer suction port and the downstream end of the bypass channel is disposed within the low-pressure turbine nozzle, and wherein the bypass channel forms a bypass fluid flow path between the inter-turbine duct and the low-pressure turbine nozzle.

In a further embodiment of the present invention, a gas turbine engine system includes a high-pressure turbine rotor, wherein the high-pressure turbine rotor comprises a first plurality of airfoils, and a low-pressure turbine nozzle, wherein the low-pressure turbine nozzle comprises a second plurality of airfoils. The gas turbine engine system also includes an inter-turbine duct having an upstream end and a downstream end, the inter-turbine duct disposed between the high-pressure turbine rotor and the low-pressure turbine nozzle, wherein the inter-turbine duct comprises an inner-body surface and an outer-body surface, and wherein the inter-turbine duct forms a primary fluid flow path. The gas turbine engine system further includes a boundary layer suction port disposed within the outer-body surface of the inter-turbine duct. The gas turbine engine still further includes a bypass channel having an upstream end and a downstream end, wherein the upstream end of the bypass channel is coupled with the boundary layer suction port and the downstream end of the bypass channel is disposed within the low-pressure turbine nozzle, and wherein the bypass channel forms a bypass fluid flow path between the inter-turbine duct and the low-pressure turbine nozzle.

In a still further embodiment of the present invention, a method for optimizing the performance of a gas turbine engine or the like includes, given a primary fluid flow through an inter-turbine duct of the gas turbine engine, diverting a predetermined portion of the primary fluid flow into a bypass channel. The method also includes transmitting the predetermined portion of the primary fluid flow to a low-pressure turbine nozzle of the gas turbine engine. The method further includes expelling the predetermined portion of the primary fluid flow into the interior of the low-pressure turbine nozzle. The method still further includes distributing the predetermined portion of the primary fluid flow along the suction side of the low-pressure nozzle and expelling it for enhanced aerodynamic benefit of the low-pressure nozzle.

DETAILED DESCRIPTION OF THE INVENTION

The systems, assemblies, and methods of the present invention use boundary layer suction on the outer-body surface of the inter-turbine duct of a gas turbine engine or the like to minimize the creation of adverse pressure gradients and prevent boundary layer separation along the outer-body surface which would otherwise limit the performance of the gas turbine engine. This allows for the use of a relatively large diameter low-pressure turbine spool, including a low-pressure turbine nozzle and an associated low-pressure turbine rotor. The low pressure required to produce the boundary layer suction is obtained from the suction side of the low-pressure turbine nozzle. Establishing a fluid flow path between these points allows for self-aspiration. Advantageously, the fluid flow ejected at the suction side of the low-pressure turbine nozzle may be used to control boundary layer separation on the diffusing side of the low-pressure turbine nozzle. This fluid flow control allows for the use of relatively fewer, more highly-loaded low-pressure turbine nozzles than is possible with conventional systems, assemblies, and methods, increasing the pressure gradient driving the self-aspiration.

Figure 1:
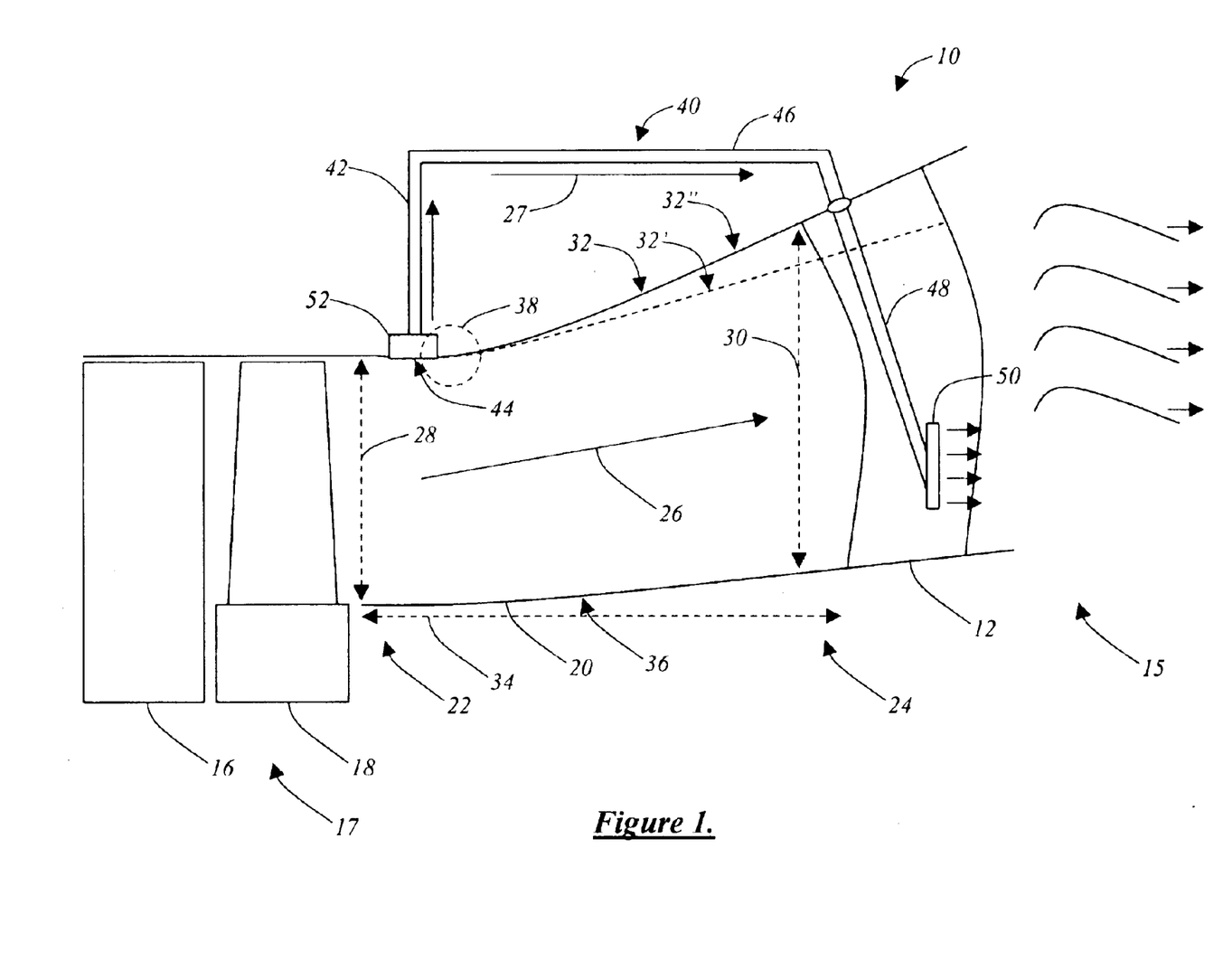
FIG. 1 is a cross-sectional schematic diagram of one embodiment of the self-aspirating high-area-ratio inter-turbine duct assembly of the present invention.

Referring to FIG. 1, in one embodiment, the self-aspirating high-area-ratio inter-turbine duct assembly 10 of the present invention includes a low-pressure turbine nozzle 12 and a low-pressure turbine rotor (not shown) separated from a high-pressure turbine nozzle 16 and a high-pressure turbine rotor 18 by an inter-turbine duct 20 that operates as an annular diffuser. Together, the low-pressure turbine nozzle 12 and the low-pressure turbine rotor form a low-pressure turbine spool 15 and the high-pressure turbine nozzle 16 and the high-pressure turbine rotor 18 form a high-pressure turbine spool 17. The high-pressure turbine spool 17 is disposed at the upstream end 22 of the inter-turbine duct 20 and the low-pressure turbine spool 15 is disposed at the downstream end 24 of the inter-turbine duct 20. Collectively, the high-pressure turbine spool 17, the inter-turbine duct 20, and the low-pressure turbine spool 15 are operable for receiving and extracting energy from a primary fluid flow 26 through the gas turbine engine, typically originating from a combustion chamber of the gas turbine engine. This energy is used to power a vehicle (such as an airplane, a helicopter, a tank, or the like), a power-generation facility or assembly, the gas turbine engine itself, etc.

As described above, there is a preferred ratio between the height 28 of the high-pressure turbine spool 17 (including the high-pressure turbine nozzle 16 and the high-pressure turbine rotor 18) and the height 30 of the low-pressure turbine spool 15 (including the low-pressure turbine nozzle 12 and the low-pressure turbine rotor) in the gas turbine engine, with the low-pressure turbine spool 15 having a relatively larger diameter than the high-pressure turbine spool 17. Other factors being equal, this ratio provides optimal gas turbine engine performance. However, in order to achieve this ratio, the slope of the outer-body surface 32 of the inter-turbine duct 20 joining the high-pressure turbine spool 17 and the low-pressure turbine spool 15 must be relatively steep. Alternatively, the length 34 of the outer-body surface 32 (and the associated inner body surface 36) of the inter-turbine duct 20 may be relatively long. Given conventional systems, assemblies, and methods, either configuration is problematic.

If the slope of the outer-body surface 32 of the inter-turbine duct 20 is relatively steep, strong adverse pressure gradients may be created along the outer-body surface 32 and boundary layer separation may occur in the inter-turbine duct 20 at a boundary layer separation point 38. As a result, gas turbine engine performance may suffer. If the length 34 of the outer-body surface 32' of the inter-turbine duct 20 is relatively long, extra weight is added to the gas turbine engine and, again, performance may suffer. Thus, conventional gas turbine engines typically use non-optimal inter-turbine ducts 20 that are relatively long and that have outer-body surfaces 32' with a relatively shallow slope. For example, an inter-turbine duct 20 with a length of approximately twice the rotor height 38 and a slope of about 31 degrees may be used (this slope 32' is illustrated in FIG. 1).

In an exemplary embodiment, the self-aspirating high-area-ratio inter-turbine duct assembly 10 of the present invention includes a bypass channel 40 operable for diverting a predetermined portion of the primary fluid flow 26 from the inter-turbine duct 20 and delivering it to a region of the low-pressure turbine nozzle 12. This predetermined portion of the primary fluid flow 26 is referred to herein as the bypass fluid flow 27. Specifically, the bypass channel 40 includes a first portion 42 extending radially-outward from the inter-turbine duct 20. The first portion 42 of the bypass channel 40 is coupled to a boundary layer suction port 44 disposed within the upstream end 22 of the outer-body surface 32 of the inter-turbine duct 20. Preferably, the boundary layer suction port 44 is disposed upstream of the boundary layer separation point 38. The bypass channel 40 also includes a second portion 46 aligned substantially parallel to the outer-body surface 32 of the inter-turbine duct 20. The bypass channel 40 further includes a third portion 48 extending radially-inward toward and into the low-pressure turbine nozzle 12. An exhaust piece 50 is coupled to the third portion 48 of the bypass channel 40. Optionally, the exhaust piece 50 includes a plenum disposed inside a portion of the low-pressure turbine nozzle 12 and a plurality of slots or holes operable for ejecting the bypass flow.

Optionally, a plurality of bypass channels 40 may be disposed concentrically about the inter-turbine duct 20 and used, the plurality of bypass channels 40 using a common boundary layer suction port 44 or, alternatively, a plurality of separate, discrete boundary layer suction ports 44 and a common exhaust piece 50 or, alternatively, a plurality of separate, discrete exhaust pieces 50. Optionally, the self-aspirating high-area-ratio inter-turbine duct assembly 10 may also include a manifold 52 operable for uniformly distributing suction force to each of the plurality of boundary layer suction ports 44, in the event that a plurality of boundary layer suction ports 44 are used.

Because the low-pressure turbine nozzle 12 is associated with relatively low static pressure conditions and the inter-turbine duct 20 is associated with relatively high static pressure conditions, a natural static pressure difference at these points results in self-aspiration through the bypass channel 40. Thus, a portion of the boundary layer fluid flow in the inter-turbine duct 20 is drawn into the bypass channel 40 and expelled out of the exhaust piece 50. This boundary layer suction in the inter-turbine duct 20, and the corresponding fluid flow expulsion in the low-pressure turbine nozzle 12, prevents or delays boundary layer separation in the inter-turbine duct 20 and allows for the manufacture and use of an outer-body surface 32 that has a relatively steep slope. This, in turn, allows a relatively short inter-turbine duct 20 to be used, minimizing weight and optimizing gas turbine engine performance. Thus, for example, a inter-turbine duct 20 with a length of about one-and-one-half times the rotor height 28 and a slope of about 40 degrees may be manufactured and used (this slope 32" is illustrated in FIG. 1).

In an alternative embodiment, the self-aspirating high-area-ratio inter-turbine duct assembly 10 of the present invention may include an annular bypass channel instead of the discrete bypass channel 40 described above. The annular bypass channel includes a first disc portion extending radially-outward from the inter-turbine duct 20. The first disc portion of the annular bypass channel is coupled to an annular boundary layer suction vent, such as a slot, a scoop, or a porous plate, disposed within the upstream end 22 of the outer-body surface 32 of the inter-turbine duct 20. Optionally, the annular boundary layer suction vent may include a porous filter-like element disposed within and about a portion of the outer-body surface 32 of the inter-turbine duct 20. The annular bypass channel also includes a second cylindrical portion aligned substantially parallel to and in a concentric relationship with the outer-body surface 32 of the inter-turbine duct 20. The annular bypass channel further includes a third disc portion extending radially-inward toward and into the low-pressure turbine nozzle 12. An exhaust piece 50 is coupled to the third disc portion of the annular bypass channel.

Figure 2:
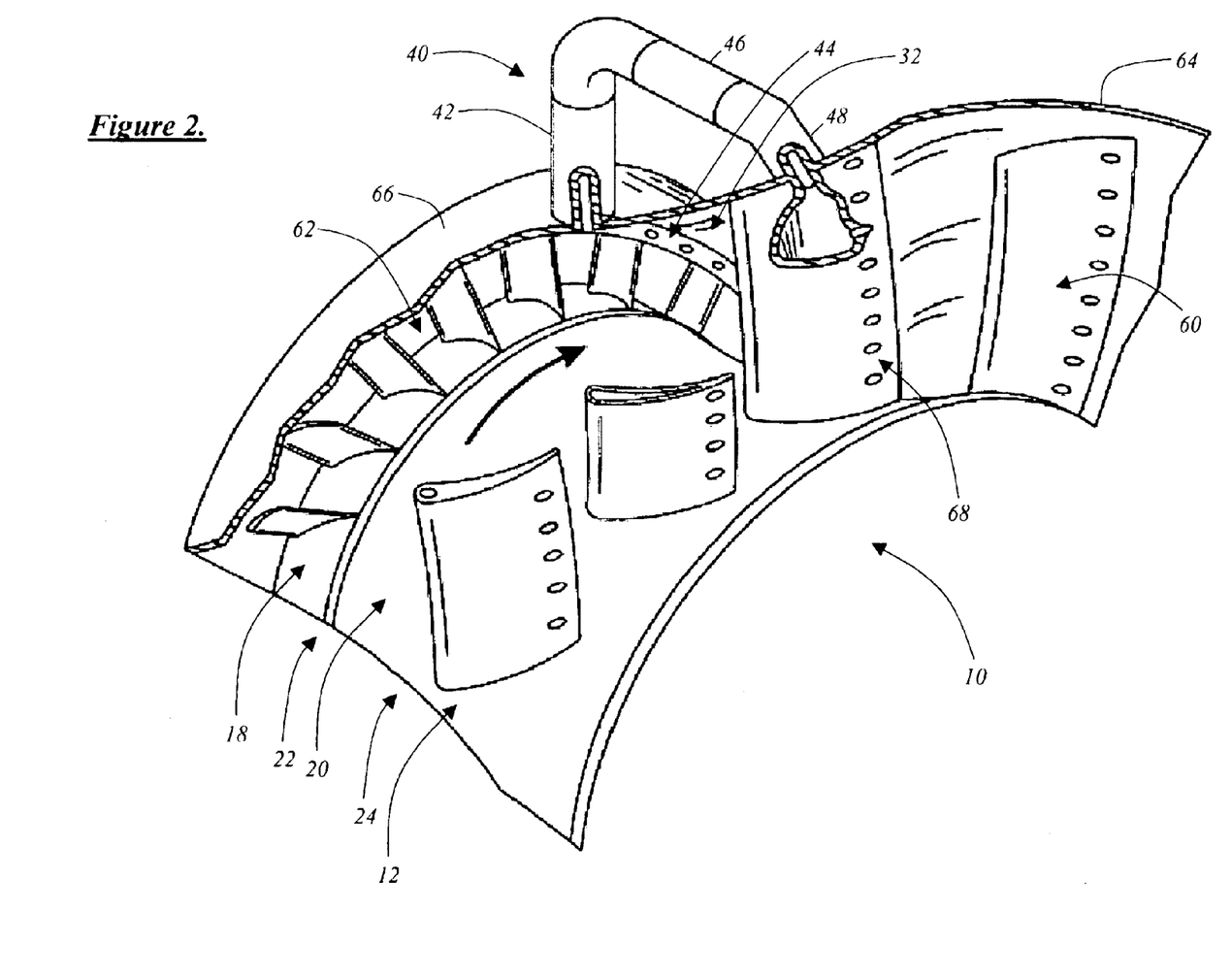
FIG. 2 is a perspective view of another embodiment of the self-aspirating high-area-ratio inter-turbine duct assembly of the present invention.

Referring to FIG. 2, in another embodiment, the self-aspirating high-area-ratio inter-turbine duct assembly 10 of the present invention includes a low-pressure turbine nozzle 12, including a plurality of stationary airfoils 60, and a low-pressure turbine rotor separated from a high-pressure turbine nozzle and a high-pressure turbine rotor 18, including a plurality of rotating airfoils 62, by an inter-turbine duct 20 that operates as an annular diffuser. Together, the low-pressure turbine nozzle 12 and the low-pressure turbine rotor form a low-pressure turbine spool and the high-pressure turbine nozzle and the high-pressure turbine rotor 18 form a high-pressure turbine spool. The low-pressure turbine spool is disposed within a low-pressure turbine casing 64 and the high-pressure turbine spool is disposed within a high-pressure turbine casing 66. The high-pressure turbine spool is disposed at the upstream end 22 of the inter-turbine duct 20 and the low-pressure turbine spool is disposed at the downstream end 24 of the inter-turbine duct 20. Collectively, the high-pressure turbine spool, the inter-turbine duct 20, and the low-pressure turbine spool are operable for receiving and extracting energy from a primary fluid flow through the gas turbine engine, typically originating from a combustion chamber of the gas turbine engine. This energy is used to power a vehicle (such as an airplane, a helicopter, a tank, or the like), a power-generation facility or assembly, the gas turbine engine itself, etc.

The self-aspirating high-area-ratio inter-turbine duct assembly 10 of the present invention also includes a bypass channel 40 operable for diverting a predetermined portion of the primary fluid flow from the inter-turbine duct 20 and delivering it to a region of the low-pressure turbine nozzle 12. This predetermined portion of the primary fluid flow is referred to herein as the bypass fluid flow. Specifically, the bypass channel 40 includes a first portion 42 extending radially-outward from the inter-turbine duct 20. The first portion 42 of the bypass channel 40 is coupled to a boundary layer suction port 44 disposed within the upstream end 22 of the outer-body surface 32 of the inter-turbine duct 20. Preferably, the boundary layer suction port 44 is disposed upstream of the boundary layer separation point. The bypass channel 40 also includes a second portion 46 aligned substantially parallel to the outer-body surface 32 of the inter-turbine duct 20. The bypass channel 40 further includes a third portion 48 extending radially-inward toward and, optionally, into the low-pressure turbine nozzle 12. Preferably, the third portion 48 of the bypass channel 40 is coupled to a plurality of exhaust ports 68 disposed within at least one of the plurality of stationary airfoils 60 of the low-pressure turbine nozzle 12.

Optionally, a plurality of bypass channels 40 may be disposed concentrically about the inter-turbine duct 20 and used, the plurality of bypass channels 40 using a common boundary layer suction port 44 or, alternatively, a plurality of separate, discrete boundary layer suction ports 44 and a common plurality of exhaust ports 68 or, alternatively, a plurality of separate, discrete pluralities of exhaust ports 68. Optionally, the self-aspirating high-area-ratio inter-turbine duct assembly 10 may also include a manifold operable for uniformly distributing suction force to each of the plurality of boundary layer suction ports 44, in the event that at least one boundary layer suction port 44 is used.

Because the low-pressure turbine nozzle 12 is associated with relatively low static pressure conditions and the inter-turbine duct 20 is associated with relatively high static pressure conditions, a natural static pressure difference at these points results in self-aspiration through the bypass channel 40. Thus, a portion of the boundary layer fluid flow in the inter-turbine duct 20 is drawn into the bypass channel 40 and expelled out of the plurality of exhaust ports 68. This boundary layer suction in the inter-turbine duct 20, and the corresponding fluid flow expulsion in the low-pressure turbine nozzle 12, prevents or delays boundary layer separation in the inter-turbine duct 20 and allows for the manufacture and use of an outer-body surface 32 that has a relatively steep slope and/or an inter-turbine duct 20 of relatively shorter length. The fluid flow expulsion in the low-pressure turbine nozzle 12 prevents or delays boundary layer separation on the suction side of the low-pressure turbine nozzle. This, in turn, allows for either a relatively higher pressure drop through the low-pressure turbine nozzle 12 or, alternatively, fewer nozzles may be used. These two characteristics may be used to minimize weight and optimize gas turbine engine perfoemance.

Figure 3:
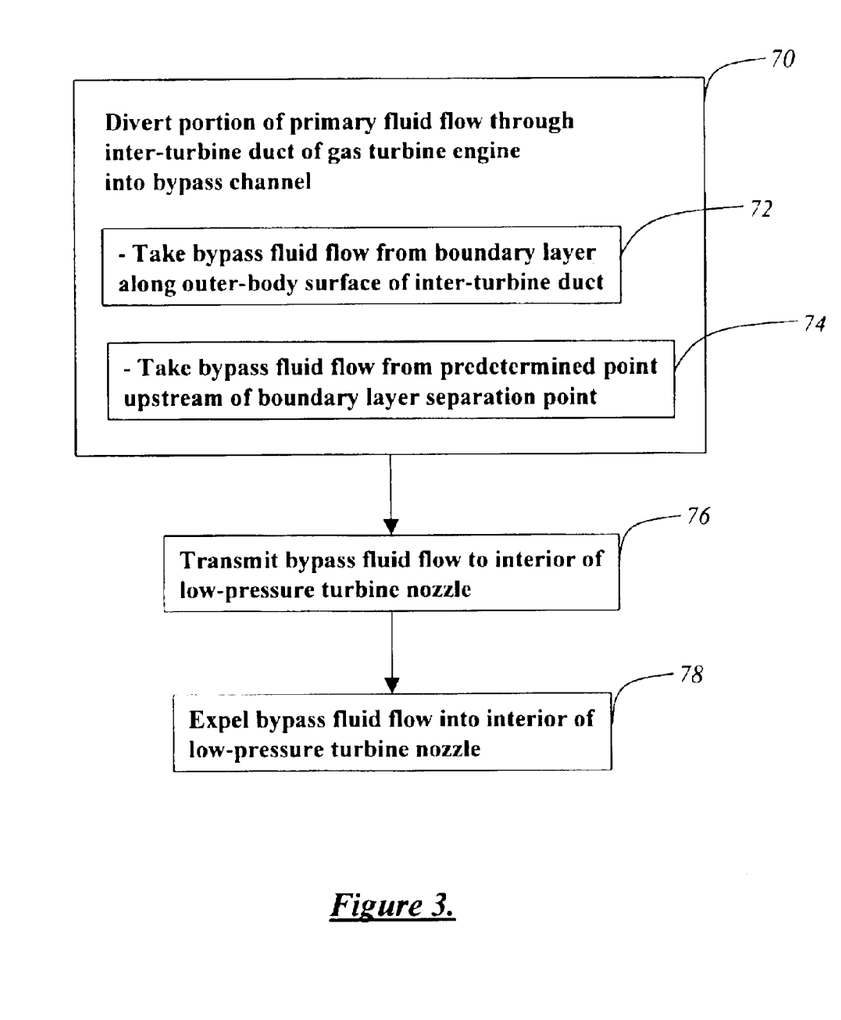
FIG. 3 is a flow chart of a method for optimizing the performance of a gas turbine engine by optimizing the ratio between the diameter of the high-pressure turbine spool and the diameter of the associated low-pressure turbine spool and/or optimizing the length of the inter-turbine duct of the gas turbine engine, the method using the self-aspirating high-area-ratio inter-turbine duct assembly of the present invention.

Referring to FIG. 3, in a further embodiment of the present invention, a method for optimizing the performance of a gas turbine engine by optimizing the ratio between the diameter of the high-pressure turbine spool and the diameter of the associated low-pressure turbine spool and/or optimizing the length of the outer-body surface of the gas turbine engine includes diverting a portion of the primary fluid flow through the inter-turbine duct of the gas turbine engine into a bypass channel. (Block 70). Preferably, this bypass fluid flow is taken from the boundary layer along the outer-body surface of the inter-turbine duct. (Block 72). Preferably, this bypass fluid flow is also taken from a predetermined point upstream of the boundary layer separation point. (Block 74). The bypass fluid flow is transmitted to the interior of the low-pressure turbine nozzle (Block 76) and expelled into the interior of the low-pressure turbine nozzle (Block 78).

It is apparent that there has been provided, in accordance with the systems, assemblies, and methods of the present invention, a self-aspirating high-area-ratio inter-turbine duct assembly for use in a gas turbine engine or the like. Although the systems, assemblies, and methods of the present invention have been described with reference to preferred embodiments and examples thereof, other embodiments and examples may perform similar functions and/or achieve similar results. All such equivalent embodiments and examples are within the spirit and scope of the present invention and are intended to be covered by the following claims.

What is claimed is:

1. An inter-turbine duct assembly for use in a gas turbine engine or the like, the inter-turbine duct assembly comprising:
   a duct configured to receive flow from a turbine, the duct having an upstream end and a downstream end, wherein the duct comprises an inner-body surface and an outer-body surface, and wherein the duct forms a primary fluid flow path;
   a port disposed within the outer-body surface of the duct;
   a nozzle coupled with the duct; and
   a channel having an upstream end and a downstream end, wherein the upstream end of the channel is coupled with the port and the downstream end of the channel is disposed within the nozzle, and wherein the channel forms a bypass fluid flow path between the duct and the nozzle.

2. The inter-turbine duct assembly of claim 1, wherein the duct comprises a first annular structure.

3. The inter-turbine duct assembly of claim 1, wherein the port comprises a region of porous material.

4. The inter-turbine duct assembly of claim 2, wherein the nozzle comprises a second annular structure.

5. The inter-turbine duct assembly of claim 1, wherein the channel comprises a tube.

6. The inter-turbine duct assembly of claim 1, wherein the channel comprises a third annular structure.

7. The inter-turbine duct assembly of claim 1, further comprising an exhaust piece coupled with the downstream end of the channel.

8. The inter-turbine duct assembly of claim 1, wherein the port is disposed adjacent to a fluid flow boundary layer present within the duct adjacent to the outer-body surface of the duct.

9. The inter-turbine duct assembly of claim 1, wherein the port is disposed between the upstream end of the duct and a fluid flow boundary layer separation point present within the duct along the outer-body surface of the duct.

10. The inter-turbine duct assembly of claim 1, where the port is disposed upstream or downstream of and in close proximity to fluid flow boundary layer separation point present within the duct along the outer-body surface of the duct.

11. The inter-turbine duct assembly of claim 1, wherein a first region defined by the duct comprises a region of relatively high pressure.

12. The inter-turbine duct assembly of claim 11, wherein a second region defined by the nozzle comprises a region of relatively low pressure.

13. The inter-turbine duct assembly of claim 12, wherein the channel forms a bypass fluid flow path between the first region of relatively high pressure of the duct and the second region of relatively low pressure of the nozzle.

14. The inter-turbine duct assembly of claim 1, wherein the fluid comprises a gas.

15. An inter-turbine duct assembly for use in a gas turbine engine or the like, the inter-turbine duct assembly comprising:
   an inter-turbine duct having an upstream end and a downstream end, wherein the inter-turbine duct comprises an inner-body surface and an outer-body surface, and wherein the inter-turbine duct forms a primary fluid flow path;
   a boundary layer suction port disposed within the outer-body surface of the inter-turbine duct;
   a low-pressure turbine nozzle coupled with the inter-turbine duct; and
   a bypass channel having an upstream end and a downstream end, wherein the upstream end of the bypass channel is coupled with the boundary layer suction port and the downstream end of the bypass channel is disposed within the low-pressure turbine nozzle, and wherein the bypass channel forms a bypass fluid flow path between the inter-turbine duct and the low-pressure turbine nozzle.

16. The inter-turbine duct assembly of claim 15, wherein the inter-turbine duct comprises a first annular structure disposed about an axis of the inter-turbine duct assembly.

17. The inter-turbine duct assembly of claim 15, wherein the boundary layer suction port comprises a region of porous material.

18. The inter-turbine duct assembly of claim 16, wherein the low-pressure turbine nozzle comprises a second annular structure disposed about an axis of the inter-turbine duct assembly.

19. The inter-turbine duct assembly of claim 15, wherein the bypass channel comprises a tube.

20. The inter-turbine duct assembly of claim 18, wherein the bypass channel comprises a third annular structure disposed about an axis of the inter-turbine duct assembly.

21. The inter-turbine duct assembly of claim 15, further comprising an exhaust piece coupled with the downstream end of the bypass channel.

22. The inter-turbine duct assembly of claim 15, wherein the boundary layer suction port is disposed adjacent to a fluid flow boundary layer present within the inter-turbine duct adjacent to the outer-body surface of the inter-turbine duct.

23. The inter-turbine duct assembly of claim 15, wherein the boundary layer suction port is disposed between the upstream end of the inter-turbine duct and a fluid flow boundary layer separation point present within the inter-turbine duct along the outer-body surface of the inter-turbine duct.

24. The inter-turbine duct assembly of claim 15, wherein a first region defined by the inter-turbine duct comprises a region of relatively high pressure.

25. The inter-turbine duct assembly of claim 24, wherein a second region defined by the low-pressure turbine nozzle comprises a region of relatively low pressure.

26. The inter-turbine duct assembly of claim 25, wherein the bypass channel forms a bypass fluid flow path between the first region of relatively high pressure of the inter-turbine duct and the second region of relatively low pressure of the low-pressure turbine nozzle.

27. The inter-turbine duct assembly of claim 15, wherein the fluid comprises a combustion gas.

28. A gas turbine engine system, comprising:
a high-pressure turbine rotor, wherein the high-pressure turbine rotor comprises a first plurality of airfoils;
a low-pressure turbine nozzle, wherein the low-pressure turbine nozzle comprises a second plurality of airfoils;
an inter-turbine duct having an upstream end and a downstream end, the inter-turbine duct disposed between the high-pressure turbine rotor and the low-pressure turbine nozzle, wherein the inter-turbine duct comprises an inner-body surface and an outer-body surface, and wherein the inter-turbine duct forms a primary fluid flow path;
a boundary layer suction port disposed within the outer-body surface of the inter-turbine duct;
a bypass channel having an upstream end and a downstream end, wherein the upstream end of the bypass channel is coupled with the boundary layer suction port and the downstream end of the bypass channel is disposed within the low-pressure turbine nozzle, and wherein the bypass channel forms a bypass fluid flow path between the inter-turbine duct and the low-pressure turbine nozzle.

29. The gas turbine engine system of claim 28, wherein the inter-turbine duct comprises a first annular structure disposed about an axis of the gas turbine engine system.

30. The gas turbine engine system of claim 28, wherein the boundary layer suction port comprises a region of porous material.

31. The gas turbine engine system of claim 29, wherein the low-pressure turbine nozzle comprises a second annular structure disposed about an axis of the gas turbine engine system.

32. The gas turbine engine system of claim 28, wherein the bypass channel comprises a tube.

33. The gas turbine engine system of claim 31, wherein the bypass channel comprises a third annular structure disposed about an axis of the gas turbine engine system.

34. The gas turbine engine system of claim 28, further comprising an exhaust piece coupled with the downstream end of the bypass channel.

35. The gas turbine engine system of claim 28, wherein the boundary layer suction port is disposed adjacent to a fluid flow boundary layer present within the inter-turbine duct adjacent to the outer-body surface of the inter-turbine duct.

36. The gas turbine engine system of claim 28, wherein the boundary layer suction port is disposed between the upstream end of the inter-turbine duct and a fluid flow boundary layer separation point present within the inter-turbine duct along the outer-body surface of the inter-turbine duct.

37. The gas turbine engine system of claim 28, wherein a first region defined by the inter-turbine duct comprises a region of relatively high pressure.

38. The gas turbine engine system of claim 37, wherein a second region defined by the low-pressure turbine nozzle comprises a region of relatively low pressure.

39. The gas turbine engine system of claim 38, wherein the bypass channel forms a bypass fluid flow path between the first region of relatively high pressure of the inter-turbine duct and the second region of relatively low pressure of the low-pressure turbine nozzle.

40. The gas turbine engine system of claim 28, wherein the fluid comprises a combustion gas.

41. A method for optimizing the performance of a gas turbine engine or the like, the method comprising:
given a primary fluid flow through an inter-turbine duct of the gas turbine engine, diverting a predetermined portion of the primary fluid flow into a bypass channel;
transmitting the predetermined portion of the primary fluid flow to a low-pressure turbine nozzle of the gas turbine engine; and
expelling the predetermined portion of the primary fluid flow into the interior of the low-pressure turbine nozzle.

42. The method of claim 41, wherein the predetermined portion of the primary fluid flow comprises a bypass fluid flow.

43. The method of claim 41, wherein diverting the predetermined portion of the primary fluid flow into the bypass channel comprises diverting a predetermined portion of a boundary layer fluid flow from along an outer-body surface of the inter-turbine duct.

44. The method of claim 43, wherein diverting the predetermined portion of the primary fluid flow into the bypass channel comprises diverting the predetermined portion of the boundary layer fluid flow from a predetermined point prior to a boundary layer separation point along the outer-body surface of the inter-turbine duct.

45. The method of claim 41, further comprising providing an inter-turbine duct comprising an outer-body surface having a predetermined slope.

46. The method of claim 45, wherein the slope of the inter-turbine duct is about 40 degrees.

47. The method of claim 41, further comprising providing an inter-turbine duct comprising an outer-body surface having a predetermined length.

48. The method of claim 47, wherein the length of the inter-turbine duct is less than about twice the height of the high-pressure turbine rotor.

49. An inter-turbine duct assembly for use in a gas turbine engine or the like, the inter-turbine duct assembly comprising:

a duct having an upstream end and a downstream end, wherein the duct comprises an inner-body surface and an outer-body surface, and wherein the duct forms a primary fluid flow path;

a port disposed within the outer-body surface of the duct between the upstream end of the duct and a fluid flow boundary layer separation point present within the duct along the outer-body surface of the duct;

a nozzle coupled with the duct; and a channel having an upstream end and a downstream end, wherein the upstream end of the channel is coupled with the port and the downstream end of the channel is disposed within the nozzle, and wherein the channel forms a bypass fluid flow path between the duct and the nozzle.

\* \* \* \* \*

UNITED STATES PATENT AND TRADEMARK OFFICE
CERTIFICATE OF CORRECTION

PATENT NO. : 6,851,264 B2
DATED : February 8, 2005
INVENTOR(S) : Kevin Kirtley et al.

It is certified that error appears in the above-identified patent and that said Letters Patent is hereby corrected as shown below:

Column 8,
Lines 16 and 17, should read as follows:
-- The inter-turbine duct assembly of claim 4, wherein the channel comprises a third annular structure. --.

Signed and Sealed this

Twenty-ninth Day of November, 2005

JON W. DUDAS
*Director of the United States Patent and Trademark Office*